Patented Dec. 16, 1941

2,266,602

UNITED STATES PATENT OFFICE 2,266,602

TREATMENT OF RUBBER

Louis H. Howland, Nutley, N. J., assignor, by mesne assignments, to United States Rubber Company, New York, N. Y., a corporation of New Jersey No Drawing. Application September 11, 1937, Serial No. 163,438

6 Claims. (Cl. 260—808)

This invention relates to the treatment of rubber and similar oxidizable materials, and more particularly to a new class of deterioration retarders.

An object of the invention is to provide a new class of anti-oxidants or age resistors for organic substances which tend to deteriorate by absorption of oxygen from the air, for example goods of rubber or allied gums, unsaturated fatty oils such as unsaturated vegetable oils, essential oils, petroleum oils and their derivatives such as gasolines, soaps, aldehydes, synthetic resins, and the like. Further objects will be apparent from the following description.

According to the invention the organic substance is treated with a small proportion of an age resistor having the general formula

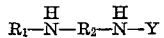

where $R_1$ is an aryl group; $R_2$ is an arylene group; and Y is a carboxy-substituted alkyl group. The carboxy group itself may be unsubstituted, or substituted. A more specific general formula is:

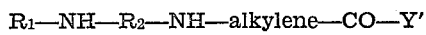

in which Y' is —OH, —O—metal, —O—ammonium, alkoxy, —NH₂, aryloxy, etc., —CO—Y' thus constituting a carboxy group or derivative thereof. Examples of substituents in the carboxy group are the ester or salt forming groups or amino groups, such as alkyl, aryl, alkaryl, aralkyl, metal, ammonium, etc. Such substituted carboxy groups may be illustrated by —CO.NH₂, —COO.Na, —COO.C₂H₅, —COO.C₆H₅, —COO.C₆H₄.CH₃, —COO.CH₂.C₆H₅, —COO.NH₄, etc. For the purpose of this invention, each of the materials of the class is referred to broadly as a carboxy-alkyl-amino diarylamine, wherein the carboxy-alkyl group is directly attached to the amino nitrogen atom, and wherein either or both of the aromatic nuclei may contain additional substituents.

By "an aryl group" herein is meant an aromatic hydrocarbon radical, whether further substituted or not in the nucleus, and having a free valence which belongs to the nucleus.

The materials may be made by any of the methods known in the art; for example, by the interaction of a primary-amino-substituted diarylamine and a halogeno-carboxylic acid or derivative thereof. In the case of halogeno compounds having more than one replaceable halogen atom, one or more of the halogens may be replaced by amino diaryl-amino groups. Examples of halogeno compounds that may be reacted with any of the amino diarylamines referred to herein include mono-chloroacetic acid; mono-chloro acetyl chloride; benzyl chloroacetate; alpha-bromo-acetoacetanilide; alpha-bromo-n-butyric acid; alpha-bromo-n-caproic acid; bromo-methyl acetate; n-butyl chloroacetate; chloroacetamide; beta-chloro propronic acid; alpha, beta-dibromo butyric acid; ethyl bromo malonate; ethyl alpha-bromo phenyl acetate; methyl alpha-bromo laurate; phenyl bromo acetate; n-propyl alpha, alpha'-dibromo succinate; bromo succinic acid, etc.

The age-resistors are preferably employed in conjunction with an organic amine adapted to neutralize any vulcanization retarding effect of the preservative.

The following examples are given to illustrate the invention and are not to be construed as limiting thereof; (the parts are by weight):

Example 1.—Equimolecular proportions, e. g. 0.1 mole, of p-amino phenyl-p-tolylamine, mono-chloro acetic acid, and anhydrous sodium acetate, are heated together in alcoholic solution for about one hour. The solution is then made alkaline with dilute aqueous sodium hydroxide and filtered. The filtrate is acidified and the white precipitate which is formed is filtered off, washed and dried. It shows a melting point of 150° C. (with decomposition), and is believed to have the formula

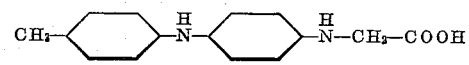

and may be termed p-(p-tolyl amino)-phenyl glycine.

A mix comprising 100 parts of pale crepe, 20 parts zinc oxide, 50 parts of lithopone, 1.0 part of heptaldehyde-aniline (accelerator) was used as a control Sample A. A similar mix but containing 1 part of the product of Example 1 together with an organic amine, e. g. 0.15 part of polyethylene polyamine was used as Sample B. Samples A and B were vulcanized and tested with the results as shown in the following table;

T represents tensiles in lbs./sq. in. at break and E is percent ultimate elongation.

| Cure in minutes at 40 lbs./sq. in. steam pressure | A | | B | |
|---|---|---|---|---|
| | T | E | T | E |
| Unaged: | | | | |
| 30 | 3,981 | 710 | 3,583 | 650 |
| 60 | 3,536 | 660 | 3,417 | 660 |
| Aged 144 hrs. in oxygen: | | | | |
| 30 | Melted | | 2,406 | 580 |
| 60 | Melted | | 1,496 | 500 |
| Aged 3 wks. at 158° F.: | | | | |
| 30 | 1,762 | 7.2 | 2,965 | 560 |
| 60 | 1,269 | 6.0 | 2,754 | 550 |

The scope of this invention covers the derivatives as described herein of primary-secondary aromatic amines among which are 4-amino diphenylamine; the 4-amino-phenyl toluidines; the 4-amino-phenyl xylidines; 4-amino-phenyl cumidines; 4-amino-4'-tertiary amyl diphenylamine; 4-amino-4'-dodecyl diphenylamine; 4-amino-4'-hexadecyl diphenylamine; 4-amino-phenyl carvacrylamine; 4-amino-3-methyl diphenylamine; 4-amino-2-methyl-4'-tertiary butyl diphenylamine; 4-amino-phenyl phenetidine; 4-amino-4'-ethoxy-2'-methyl diphenylamine; 4-amino-2-ethyl-3'-propoxy diphenylamine; 4-amion-4'-dodecyloxy diphenylamine; 4-amino-4'-hexadecyloxy diphenylamine; 4-amino-4'-(butyl-mercapto)-diphenylamine; 4-amino-4'-(amyl-selenyl) diphenylamine; 1-amino-4-phenylamino naphthalene and other amino arylamino naphthalenes; the 4-aminophenyl naphthylamines; 4-amino-tolyl naphthylamines; N-(p-amino-phenyl)-1-methyl-beta-napthylamine; 4-amion-4'-toluidino diphenyl; 4-amino-4'-dimethylamine-diphenylamine; 4-amino-4'-diamyl-amino-diphenylamine; 4-amino-4'-morpholyl-diphenylamine; 4-amino-4'-piperidyl-diphenylamine; 4-amino-4'-dodecyl-amino-diphenylamine; 4-amino-4'-anilino-diphenylamine; 4-amino-4'-hydroxy-diphenylamine; N-(4-amino-phenyl)-N'-(4-hydroxylphenyl)-p-phenylene diamine; N-(4-aminophenyl)-N'-(4-alkoxy-phenyl)-p-phenylenediamine; N-(4-amino-phenyl)-N'-(4-butyl-mercapto phenyl)-p-phenylenediamine; 4,4'-diamino-diphenylamine; N,N'-di-(4-amino-phenyl)-p-phenylene diamine; and the meta-amino-phenyl aryl amines.

The substituted alkyl group may be other than substituted methyl, for example, substituted ethyl, propyl, butyl, amyl, hexyl, heptyl, octyl, dodecyl, etc. The substitution is brought about by removal of the chlorine in the corresponding chlor-carboxylic acid compound.

These various carboxy-alkyl-aminodiarylamines may be used in conjunction with other types of antioxidants for example the ketone-diarylamine reaction products such as acetone-diphenylamine, acetone-aniline and their homologues and analogues.

The invention may be applied to the perservation of natural rubber compositions, as well as artificially-prepared rubber compositions, including reclaimed rubbers, and latices of such rubber compositions.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surfaces of vulcanized or unvulcanized rubber goods.

Having thus described my invention, what I claim and desire to protect by Letters Patent is:

1. A process of preserving organic substances which tend to deteriorate by absorption of oxygen from the air which comprises incorporating therein an anti-oxidant having the general formula

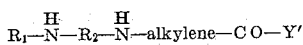

where $R_1$ is an aryl group; $R_2$ is an arylene group; and $Y'$ is a member selected from the group consisting of an amino, -O-metal, -O-ammonium, hydroxy, alkoxy and an aryloxy group.

2. A process of preserving organic substances which tend to deteriorate by absorption of oxygen from the air which comprises incorporating therein an anti-oxidant having the general formula

where $R_1$ is an aryl group; and $R_2$ is an arylene group.

3. A process of preserving organic substances which tend to deteriorate by absorption of oxygen from the air which comprises incorporating therein a compound having the general formula

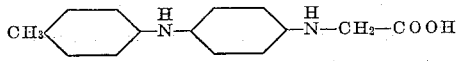

4. A composition comprising rubber and a compound having the general formula

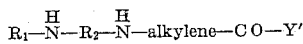

where $R_1$ is an aryl group; $R_2$ is an arylene group; and $Y'$ is a member selected from the group consisting of an amino, -O-metal, -O-ammonium, hydroxy, alkoxy and an aryloxy group.

5. A composition comprising rubber and a compound having the general formula

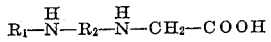

where $R_1$ is an aryl group; and $R_2$ is an arylene group.

6. A composition comprising rubber and a compound having the general formula

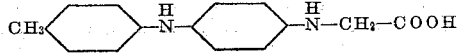

LOUIS H. HOWLAND.